United States Patent [19]
Kollanyi

[11] Patent Number: 4,513,341
[45] Date of Patent: Apr. 23, 1985

[54] OVERVOLTAGE PROTECTION CIRCUIT FOR POWER SUPPLY

[75] Inventor: Miklos J. Kollanyi, Cupertino, Calif.

[73] Assignee: GTE Lenkurt Incorporated, Phoenix, Ariz.

[21] Appl. No.: 516,503

[22] Filed: Jul. 25, 1983

[51] Int. Cl.³ .............................................. H02H 3/20
[52] U.S. Cl. ...................................... 361/91; 361/18; 361/58; 361/59
[58] Field of Search ....................... 361/18, 91, 88, 89, 361/94, 59, 58; 307/135, 141, 141.4, 125, 131

[56] References Cited

U.S. PATENT DOCUMENTS

| | | | |
|---|---|---|---|
| 3,988,643 | 10/1976 | Morris | 361/18 |
| 4,363,068 | 12/1982 | Burns | 361/91 |
| 4,427,899 | 1/1984 | Bruns | 361/88 X |
| 4,438,473 | 3/1984 | Cawley et al. | 361/18 |

Primary Examiner—Patrick R. Salce
Attorney, Agent, or Firm—Russell A. Cannon

[57] ABSTRACT

Surge-current that occurs when the pair of input lines of a power supply are energized is limited by connecting the source-to-drain path of an insulated gate FET in series in one input line and connecting its gate to an intermediate node of a voltage divider that is connected across the input lines, with an integrating capacitor connected between the node and one input line for reducing the rate of conduction of the FET. Overvoltage protection is provided by electrically connecting a latch circuit between the node and the one input line, with the FET's gate being electrically connected to the collector of a latch transistor that has its base driven by an overvoltage indication. The series combination of a timing resistor and timing capacitor is connected across the primary conduction path of the FET and the base of a unijunction transistor that has its emitter directly connected to the junction of the resistor and capacitor and AC coupled to the base of the latch transistor. A prescribed time interval (set by charging the timing capacitor to the trigger voltage of the unijunction) after the latch is set by an overvoltage condition, the unijunction fires for discharging the timing capacitor and resetting the latch, and thus the power supply.

15 Claims, 2 Drawing Figures

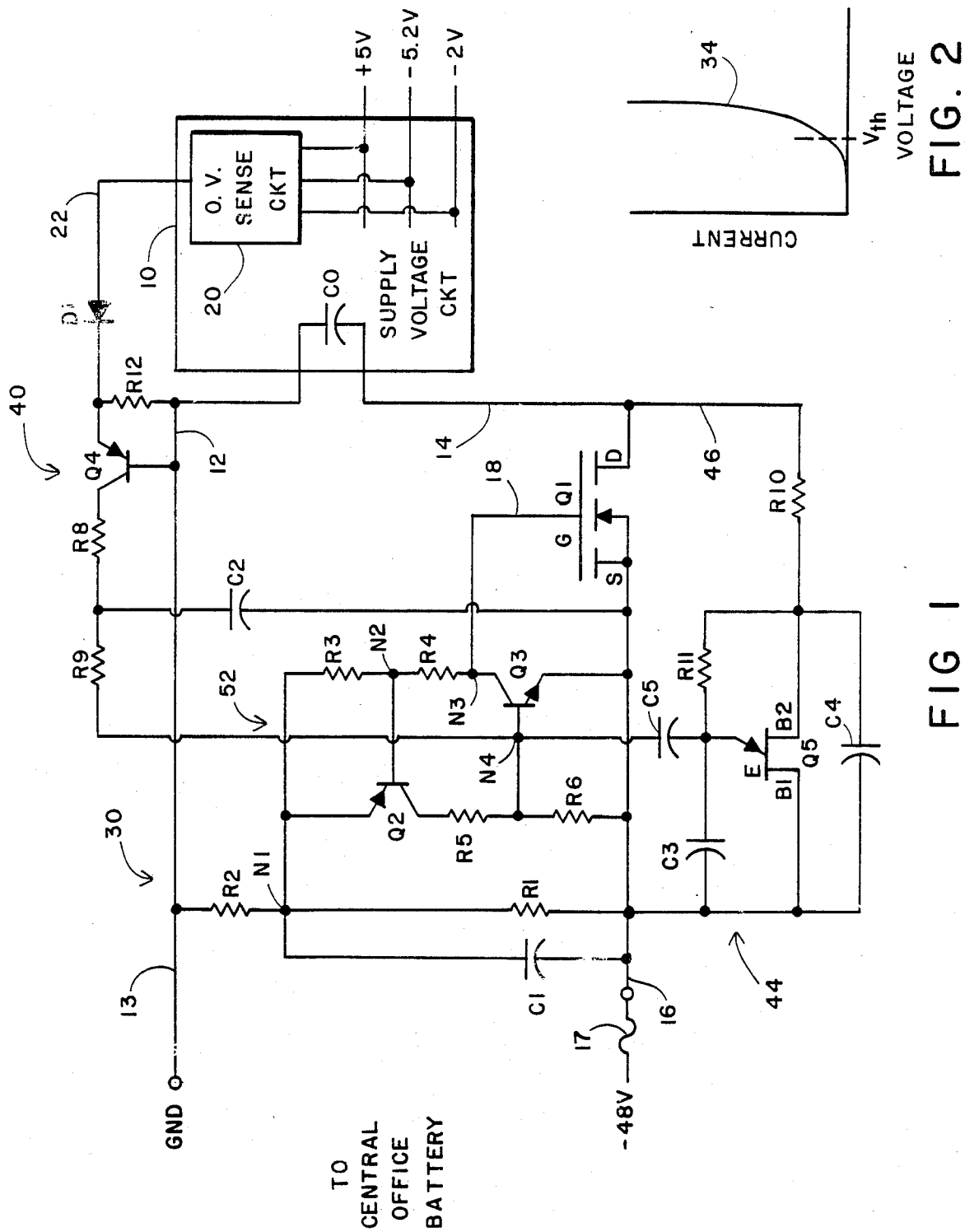

OVERVOLTAGE PROTECTION CIRCUIT FOR POWER SUPPLY

RELATED APPLICATION

This application is related to Ser. No. 516,504, filed July 25, 1983.

BACKGROUND OF INVENTION

This invention relates to control circuits for power supplies, and more particularly to method and apparatus for limiting surges of current occuring during power-up of the power supply and/or to shutting off the power supply in response to an overvoltage condition in one of the output voltages thereof.

Previously, a series resistor was used to limit the initial current surge occurring when a pair of input lines of a power supply were connected to a battery. Once the input-filter capacitor of the power supply was charged to a prescribed level, an SCR (silicon controlled rectifier) fired for short circuiting the resistor and removing it from the circuit. This results in a fixed voltage drop in the input lines to the power supply. And in telephone systems with racks of equipment in a central office, the ground lead connecting a 48 volt central office battery to the associated power supply may be as much as 8 feet long such that the line resistance is not negligible for surge currents in the hundreds of amperes. The resultant voltage drop in the ground lead may be as much as 20 volts. This means that a 20 volt difference in potential, for example, exists momentarily between equipment panels that are connected to different ends of the ground lead. It has been found that such differences in ground potential are sufficient to cause burn out of integrated circuits in associated equipment. Also, when a printed circuit board containing the power supply is plugged into a connector, and thus to the battery leads, the resultant surge current is sufficient to burn the pins on the board. Overvoltage protection was previously provided by a crowbar circuit which blew the main fuse in the power supply by selectively firing an SCR that was connected across the battery. This can cause a huge current surge, in excess of 200 amperes, which may damage elements of the power supply or associated equipment. Additionally, such a protection circuit cannot be made to automatically reset when the overvoltage condition goes away. Also, removing a circuit board that forms part of the load for the power supply may cause a surge current that is sufficient to trigger the crowbar circuit. In such a circuit arrangement, it is necessary for a repair person to make a trip to the location containing the power supply, or at least to physically locate and replace the fuse. In order to avoid frequent and unwarranted shut downs of equipment including such a crowbar circuit, a wide overvoltage margin must be designed into it. It is desirable to have an overvoltage protection circuit which will disable the power supply for only a short time interval following an overvoltage condition, and which will automatically restart the power supply after a prescribed time interval or when the overvoltage condition is no longer present.

SUMMARY OF INVENTION

An object of this invention is the provision of an improved overvoltage protection circuit.

In accordance with this invention, apparatus responsive to an overvoltage indication from an overvoltage sensing circuit in a power supply for interrupting electrical connection of a pair of input lines of the latter from a power source, comprises: first means having its primary conduction path electrically connected in series in one of the power supply input lines, the first means conducting to pass substantial primary conduction current in the one line in response to a prescribed control voltage applied to a control lead thereof; second means electrically connected across the input lines for developing a control voltage of greater than the prescribed value at a node therebetween when the input lines are connected to the power source; third means for electrically connecting the node to the control lead of the first means for causing the latter to pass current through the power supply when the control voltage is greater than the prescribed value; and latch means electrically connected between the node and the one input line and havng an input terminal connected to the overvoltage sensing circuit, the latch means being responsive to an overvoltage signal from the latter on the input terminal for changing the value of control voltage to much less than the prescribed value for causing the first means to block current flow in the one input line. In accordance with another aspect of this invention, means for resetting the latch means at a prescribed time interval after it is set comprises a timing resistor and timing capacitor electrically connected in series across the primary conduction path of the first means; fifth means AC coupling the junction of the resistor and capacitor to the latch means; and voltage breakdown means electrically connected across said capacitor; the capacitor charging when the first means is cut off by the latch means; the breakdown means conducting when the charge voltage on the capacitor exceeds an associated threshold value for discharging the latter; the fifth means coupling a representation of discharge of the capacitor to the latch means for resetting the latter.

DESCRIPTION OF PREFERRED EMBODIMENTS

This invention will now be described in detail in relation to the single sheet of drawing in which:

FIG. 1 is a schematic circuit diagram of apparatus including a preferred embodiment of this invention; and FIG. 2 is a curve illustrating the conduction characteristic of Q1.

Referring now to FIG. 1, a power supply 10 of conventional design includes an input filter capacitor C0 having one side connected on line 12 to the ground side of a central office battery and having the other side thereof connected through line 14, the primary conduction path of an insulated gate field effect transistor switch Q1, line 16, and a fuse 17 to the negative terminal of a power source such as a −48 volt central office battery. The transistor Q1 is preferably a high power insulated gate FET that is capable of conducting a large amount of DC current. Alternatively, Q1 may be an other type of FET or bipolar switching transistor with high input inpedance such as is provided by a Darlington circuit. In accordance with one aspect of this invention, however, Q1 preferably has a soft knee in its conduction characteristic 11 as is illustrated in FIG. 2. The function of the power supply 10 is to provide output voltages such as −5.2 volts, −2 volts, and +5 volts, with respect to ground, which are coupled to an overvoltage sensing circuit 20 of the former for producing an indication on line 22 of an overvoltage condition in one of the output voltages thereof.

In accordance with another aspect of this invention, circuit means 30 operates for limiting the surge current or rate of increase in current on input lines 13 and 16 when the latter are traces or busses on a printed circuit card, for example, that is plugged into a connector for abruptly connecting the input lines to the battery or other power source. The circuit 30 comprises a voltage divider including resistors R1 and R2 which are connected in series across the input terminals 13 and 16, and which is loaded by an integrating capacitor C1 that is connected across R1. The node N1 of the voltage divider is resistively electrically connected through R3 and R4 to the Q1 gate. Since the voltage across a capacitor cannot change instantaneously, when lines 13 and 16 are connected to the central office battery all of the battery voltage is initially across R2. This means that the charge voltage on C1, and electrically connected to the Q1 base electrode, gradually increases relatively slowly, until the battery voltage is correctly divided between R1 and R2. As is illustrated in FIG. 2, as the charge voltage on C1 gradually increases, the resistance of Q1 decreases and there is a corresponding increase in the primary conduction current of Q1 on line 12 which charges the input-filter capacitor C0 of the power supply 10. Since the Q1 gate voltage changes relatively slowly, the Q1 conduction current may now charge C0 to its full voltage while the Q1 gate voltage is still in the area of the knee of its conduction characteristic and proximate its threshold voltage Vth. It has been determined that a current of 1 ampere in line 14 will fully charge a filter capacitor C0 of 390 micro farads to its full voltage, which is substantially equal to the battery voltage, within 20 milliseconds.

When the charge voltage on C1 and the gate of Q1 exceeds its threshold voltage, the resistance of Q1 gradually approaches a short circuit where Q1 can pass on line 14 whatever current is demanded. In this manner, the circuit 30 limits the surge current in lines 13 and 16 to a nominal value during turn-on of the power supply. Also, values of R1 and C1 are selected so that momentarily removing a printed circuit board including the power supply 10 and circuit 30 from the connector will cause C1 to discharge to a voltage which is much less than the Q1 threshold voltage for cutting off Q1 prior to the circuit board being plugged back into the connector and the battery. This prevents the in-rush current on lines 13 and 16 being higher than a nominal value when the associated circuit board is repeatedly inserted and removed from the battery connector.

In accordance with another aspect of this invention, a disconnect circuit 40 is responsive to an overvoltage indication or signal on line 22 for disconnecting the power supply from the battery, and a circuit 44 automatically resets or restarts the power supply after a prescribed time delay. The disconnect circuit 40 includes a latch 52 that is connected across R1 for controlling the conduction of Q1. The latch comprises a pair of transistors Q2 and Q3, each having the series combination of its emitter-collector path and an associated pair of collector resistors connected across R1, with the base of one transistor being directly electrically connected to the junction of the collector resistors of the other transistor. A control signal from the overvoltage sensing circuit 20 is connected through a diode D1 and control transistor Q4 to the Q3 base electrode for turning on Q3, and thus Q2, and setting the latch. A bypass capacitor C2 is connected between the junction of resistors R8 and R9 and line 16 for bypassing any extraneous AC signals entering the circuit at this point away from the latch circuit.

The reset circuit 44 comprises a unijunction transistor Q5 having its first base B1 directly connected to the Q1 source and its second base B2 resistively connected to the Q1 drain, with the Q5 emitter being capacitively coupled to the Q3 base. A timing resistor R11 and timing capacitor C3 are connected in series between the Q5 emitter and the Q5 bases B2 and B1, respectively, with a filter capacitor C4 also connected across the Q5 bases for bypassing AC signal variations in the signal current from the power supply on line 46.

With the lines 13 and 16 connected to the battery long enough for C1 to be charged and turn on Q1, the latch 52 is normally reset with Q2 and Q3 cut off. When an overload condition is detected by circuit 20, a control voltage is produced on line 22 for causing D1 and Q4 to conduct for applying a positive current to node N4 which turns on Q3, and thus Q2, and sets the latch. Since the latch transistors are resistively connected across C1, conduction of Q2 and Q3 discharges C1 below the threshold potential of Q1. Also, conduction of Q3 pulls the node N3 potential close to −48 volts for cutting off Q1 and interrupting supply current for the power supply 10. The latch 52 remains in this set condition for holding Q1 cut off until it is reset.

The unijunction transistor Q5 is normally cut off and C3 discharged during conduction of Q1. When Q1 is cut off, however, current on line 14 is diverted through R10 for charging C3 and C4. When the charge voltage on C3 exceeds a prescribed threshold level for forward biasing the emitter-base B1 junction of the unijunction, then Q5 conducts and rapidly discharges C3. The resultant steeply falling edge of the charge voltage on C3 is differentiated by C5 and R6 for producing a negative pulse at the Q3 base for turning off the latter, and thus Q2, and resetting the latch. Since conduction of Q2 and Q3 (when the latch is set) partially discharges C1 for reducing the voltage at N1, this circuit combination again causes the rate of increase of line current in the power supply to increase only gradually after operation thereof is restarted by the circuit 44. The time interval that the power supply is turned off by the latch circuit 52 is determined by the charging time constant set by R11 and C3, and to some extent R10.

In an embodiment of this invention which was built and satisfactorily operated, the surge current during start-up of a power supply 10 was reduced from approximately 200 amperes to 2.5 amperes. In an embodiment of this invention which operated in conjunction with a −48 volt battery the resistances in the voltage divider were R1=215K ohms and R2=511K ohms, with a loading capacitance of C1=2.2 micro farads. In this circuit, the FET Q1 was an IR F130 transistor, Q2 was a 2N2907 transistor, Q3 was 2N3903 transistor, and the unijunction was a model 2N4949 transistor. The timing elements for establishing restarting of the power supply following setting of the latch circuit was determined by elements R11=215K ohms, and C3=4.7 micro farads; with R8=909K ohms, R9=10K ohms, and R10=34.8K ohms. In an embodiment for operating in conjunction with a −24 volt central office battery, circuit variations were such that R2=215K ohms, R8=422K ohms, and R10=12.1K ohms.

Although this invention is described in relation to preferred embodiments thereof, variations and modifications thereof will occur to those skilled in the art. By way of example, the power supply and circuits of this invention may be energized by a power source other than a central office battery. Also, transistor Q1 may be other types of field effect transistors such as an IRF530 or an RCA 9212, or a bipolar switching transistor, although the conduction characteristic of any such transistor Q1 preferably has a soft knee as is illustrated in FIG. 2. Also, the transistor Q5 may be other types of voltage threshold-breakdown devices such as an SCR, a breakdown diode, an avalanche diode, a neon tube, a trigger diode, etc. The scope of this invention is therefore to be determined from the appended claims rather than from the aforementioned detailed descriptions of preferred embodiments thereof.

What is claimed is:

1. Apparatus responsive to an overvoltage indication from an overvoltage sensing circuit of a power supply for interrupting electrical connection of a pair of input lines that are connected between the power supply and a power source, comprising:

first means having a primary conduction path thereof electrically connected in series in one of the power supply input lines, said first means conducting substantial current in said primary conduction path in said one line in response to a prescribed control voltage of greater than a prescribed value applied to a control lead thereof;

second means electrically connected across the input lines for developing said control voltage of greater than the prescribed value at a node therebetween when the input lines are connected to the power source;

third means for electrically connecting said node to the control lead of said first means for causing the latter to conduct current through the power supply when the control voltage is greater than the prescribed value; and latch means electrically connected between said node and said one input line and having an input terminal connected to the overvoltage sensing circuit, said latch means being responsive to an overvoltage signal from said sensing circuit on said input terminal for decreasing the value of control voltage to much less than the prescribed value for cutting off said first means for causing said first means to block current flow in said one input line.

2. Apparatus according to claim 1 wherein said second means comprises a voltage divider electrically connected between the two input lines and having said node between resistors thereof, said latch means being responsive to an overvoltage signal for decreasing the resistance between said node and said one input line for decreasing the control voltage to much less than the prescribed value for cutting off said first means.

3. Apparatus according to claim 2 further comprising fourth means electrically connected between said node and said one input line for limiting the rate of increase of said control voltage at said node when the input lines are initially connected to the power source and thereby limiting the conduction rate of said first means and the rate of current increase in the lines.

4. Apparatus according to claim 3 wherein said fourth means comprises an integrating capacitor.

5. Apparatus according to claim 4 wherein said first means comprises a field effect transistor having a conduction characteristic with a soft knee whereby its conduction rate gradually increases with increase in gate-control voltage until the latter reaches a threshold value, which is the prescribed value, above which its primary conduction path approaches a much lower resistance.

6. Apparatus according to claim 5 wherein said first means is an insulated gate field effect transistor.

7. Apparatus according to claim 2 comprising fourth means electrically connected between said input terminal of said latch means and said one input line for bypassing high frequency components in the output of the overvoltage sensing circuit.

8. Apparatus according to claim 2 wherein said latch means comprises first and second transistors of opposite conductivity types each having a base electrode and each having its primary, i.e., emitter-collector, conduction path and collector resistors electrically connected in series between said node and said one input line in a separate branch, and each latch transistor having its base electrode electrically connected to a node between collector resistors of the other transistor; and fourth means electrically connecting the overvoltage signal to the base electrode of one of said first and second transistors.

9. Apparatus according to claim 8 wherein the collector electrode of one of said latch transistors is electrically connected to said control lead.

10. Apparatus responsive to an overvoltage indication from an overvoltage sensing circuit of a power supply for interrupting electrical connection of a pair of input lines that are connected between the power supply and a power source, comprising:

first means having a primary conduction path thereof electrically connected in series in one of the power supply input lines, said first means conducting substantial current in said primary conduction path in said one line in response to a prescribed control voltage of greater than a prescribed value applied to a control lead thereof;

second means electrically connected across the input lines for developing said control voltage of greater than the prescribed value at a node therebetween when the input lines are connected to the power source; said second means comprising a voltage divider electrically connected between the two input lines and having said node between resistors thereof;

third means for electrically connecting said node to the control lead of said first means for causing the latter to conduct current through the power supply when the control voltage is greater than the prescribed value;

latch means comprising an input terminal connected to the overvoltage sensing circuit, and first and second transistors of opposite conductivity types each having a base electrode and each having its primary, i.e., emitter-collector, conduction path and collector resistors electrically connected in series between said node and said one input line in a separate branch; each of said latch transistors having its base electrode electrically connected to a node between collector resistors of the other latch transistor;

fourth means electrically connecting the overvoltage signal to the base electrode of one of said first and second transistors;

said third means resistively electrically connecting said node to said control lead of said first means through a collector resistor of one of said first and second transistors;

said latch means being responsive to an overvoltage signal from said sensing circuit on said input terminal thereto for decreasing the value of control voltage to much less than the prescribed value for cutting off said first means for causing said first means to block current flow in said one input line.

11. Apparatus according to claim 10 including means for resetting said latch means at a prescribed time interval after it is set.

12. Apparatus according to claim 11 wherein said reset means comprises:

a first timing resistor and a first timing capacitor electrically connected in series across the primary conduction path of said first means;

fifth means AC coupling the junction of said first resistor and first capacitor to the base electrode of one of said first and second transistors; and sixth means, which is a voltage breakdown means, electrically connected across the said first capacitor;

said first capacitor charging when said first means is cut off by said latch means;

said first capacitor discharging through said sixth means when the charge voltage on the former exceeds a prescribed threshold level whereby said fifth means couples a representation of discharge of said first capacitor to the base electrode of one of said first and second transistors for resetting said latch circuit.

13. Apparatus according to claim 12 wherein one sides of said first resistor and first capacitor are electrically connected together and said voltage breakdown means comprises a unijunction transistor having first and second base electrodes connected to other sides of said first resistor and capacitor and an emitter electrode connected to the junction of said one sides of said first resistor and first capacitor.

14. Apparatus according to claim 13 further comprising a second AC coupling capacitor electrically connected between the base electrodes of said unijunction transistor for bypassing AC components on the input lines.

15. Apparatus according to claim 14 wherein said first means comprises an insulated gate field effect transistor.

* * * * *